United States Patent
Morimoto et al.

(10) Patent No.: US 7,083,020 B2
(45) Date of Patent: Aug. 1, 2006

(54) AUTOMATIC STOP/START CONTROLLER FOR ENGINE AND METHOD FOR CONTROLLING AUTOMATIC STOP AND AUTOMATIC START

(75) Inventors: Kazuhiko Morimoto, Shizuoka-ken (JP); Tatsuji Mori, Shizuoka-ken (JP); Norihiro Noda, Shizuoka-ken (JP); Yoshiki Itoh, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 26 days.

(21) Appl. No.: 10/761,176

(22) Filed: Jan. 20, 2004

(65) Prior Publication Data

US 2004/0159479 A1    Aug. 19, 2004

(30) Foreign Application Priority Data

Jan. 21, 2003    (JP)    ............................. 2003-012131

(51) Int. Cl.
*B60K 41/04*    (2006.01)
(52) U.S. Cl. .................... 180/65.2; 180/287; 180/65.3; 180/65.4; 180/179.4
(58) Field of Classification Search ............... 180/65.2, 180/65.3, 65.4, 287; 123/179.4; 477/2, 477/3
See application file for complete search history.

(56) References Cited

U.S. PATENT DOCUMENTS

| | | | | |
|---|---|---|---|---|
| 4,630,577 | A * | 12/1986 | Cornacchia | 123/179.3 |
| 5,653,659 | A * | 8/1997 | Kunibe et al. | 477/111 |
| 6,434,475 | B1 * | 8/2002 | Kaneko et al. | 701/112 |
| 6,676,565 | B1 * | 1/2004 | Mizutani | 477/111 |
| 2004/0149247 | A1 * | 8/2004 | Kataoka et al. | 123/179.4 |

FOREIGN PATENT DOCUMENTS

| | | | |
|---|---|---|---|
| JP | 11343894 A | * | 12/1999 |
| JP | 2000-265870 | | 9/2000 |

* cited by examiner

*Primary Examiner*—Chris Ellis
*Assistant Examiner*—Cynthia F. Collado
(74) *Attorney, Agent, or Firm*—Flynn, Thiel, Boutell & Tanis, P.C.

(57) ABSTRACT

An automatic stop/start controller for an engine which automatically stops and starts the engine without operation of an ignition key. In automatically stopping the engine without operation of the ignition key, a control means prevents an automatic stop of the engine if a direction indicator of the vehicle is activated. If the direction indicator is activated after the engine is automatically stopped, the control means immediately automatically starts the engine without operation of the ignition key. The control means also prevents an automatic stop of the engine unless the distance traveled by a vehicle, after the engine has automatically started, is greater than a predetermined automatic stop prohibit distance.

5 Claims, 3 Drawing Sheets

AUTOMATIC STOP/START CONTROLLER FOR ENGINE AND METHOD FOR CONTROLLING AUTOMATIC STOP AND AUTOMATIC START

CROSS REFERENCES TO RELATED APPLICATIONS

This application is related to the following patents and copending application: (1) U.S. Pat. No. 6,942,594 titled "AN AUTOMATIC STOP/START CONTROLLER FOR AN ENGINE"; (2) Ser. No. 10/761,178, filed concurrently herewith, and titled "AUTOMATIC STOP/START CONTROLLER FOR ENGINE"; and (3) U.S. Pat. No. 6,895,917 titled "AUTOMATIC STOP/START CONTROLLER FOR ENGINE", the entire disclosures of which are herein incorporated by reference.

FIELD OF THE INVENTION

This invention relates to an automatic stop/start controller for an engine, and more particularly to an automatic stop/start controller for a vehicle engine to realize smooth driving while respecting the driver's will in making a right or left turn of a vehicle.

BACKGROUND OF THE INVENTION

Some vehicles are provided with an automatic stop/start controller to automatically stop and start an engine in order to improve fuel economy.

A conventional automatic stop/start controller system includes both an engine and a motor as a driving source for a vehicle. The controller stops the engine while the vehicle is stopped, and starts the engine to generate a driving force after the vehicle is started by the motor. In this controller, the automatic stop is prevented, at least, if a direction indicator of the vehicle is activated (see JP Laid-Open No. 2000-265870)

The conventional automatic stop/start controller prevents the automatic stop of the engine when the direction indicator is activated, thereby indicating that the vehicle is to turn right or left at an intersection of the road.

However, the engine is undesirably automatically stopped in a situation where the vehicle is at the intersection with the direction indicator activated but is then deactivated due to the operation of a steering wheel, such as when the vehicle proceeds to turn, but the vehicle is then forced to stop at the intersection owing to a traffic jam and the like.

Accordingly, in the conventional automatic stop/start controller, the engine can unwillingly be automatically stopped, irrespective of the driver's intention, before the process of turning right or left at the intersection of the road is finished. As such, operation of the engine in accordance with the driver's will is not achieved.

SUMMARY OF THE INVENTION

In order to obviate or minimize the above-mentioned inconvenience, the present invention provides an automatic stop/start controller for an engine which automatically stops and starts the engine without operation of an ignition key. In automatically stopping the engine without operation of the ignition key, a control means prevents the automatic stop of the engine if a direction indicator of the vehicle is activated. If the direction indicator is activated after the engine is automatically stopped by the controller (i.e., without the ignition key), the control means immediately and automatically re-starts the engine without operation of the ignition key. The control means also prevents the automatic stop of the engine until the distance traveled by the vehicle after the engine is automatically started is greater than a predetermined automatic stop prohibit distance.

According to the present invention, when the vehicle is turning right or left, and the activated indicator is deactivated due to the operation of the steering wheel but the vehicle is forced to stop at the intersection of the road owing to the traffic jam and the like, the engine is immediately automatically started by activation of the direction indicator. Even if the vehicle is stopped after automatic start of the engine, the engine is not automatically stopped again until the distance of travel after the engine is automatically started is greater than the predetermined automatic stop prohibit distance.

DETAILED DESCRIPTION

Figure 1:
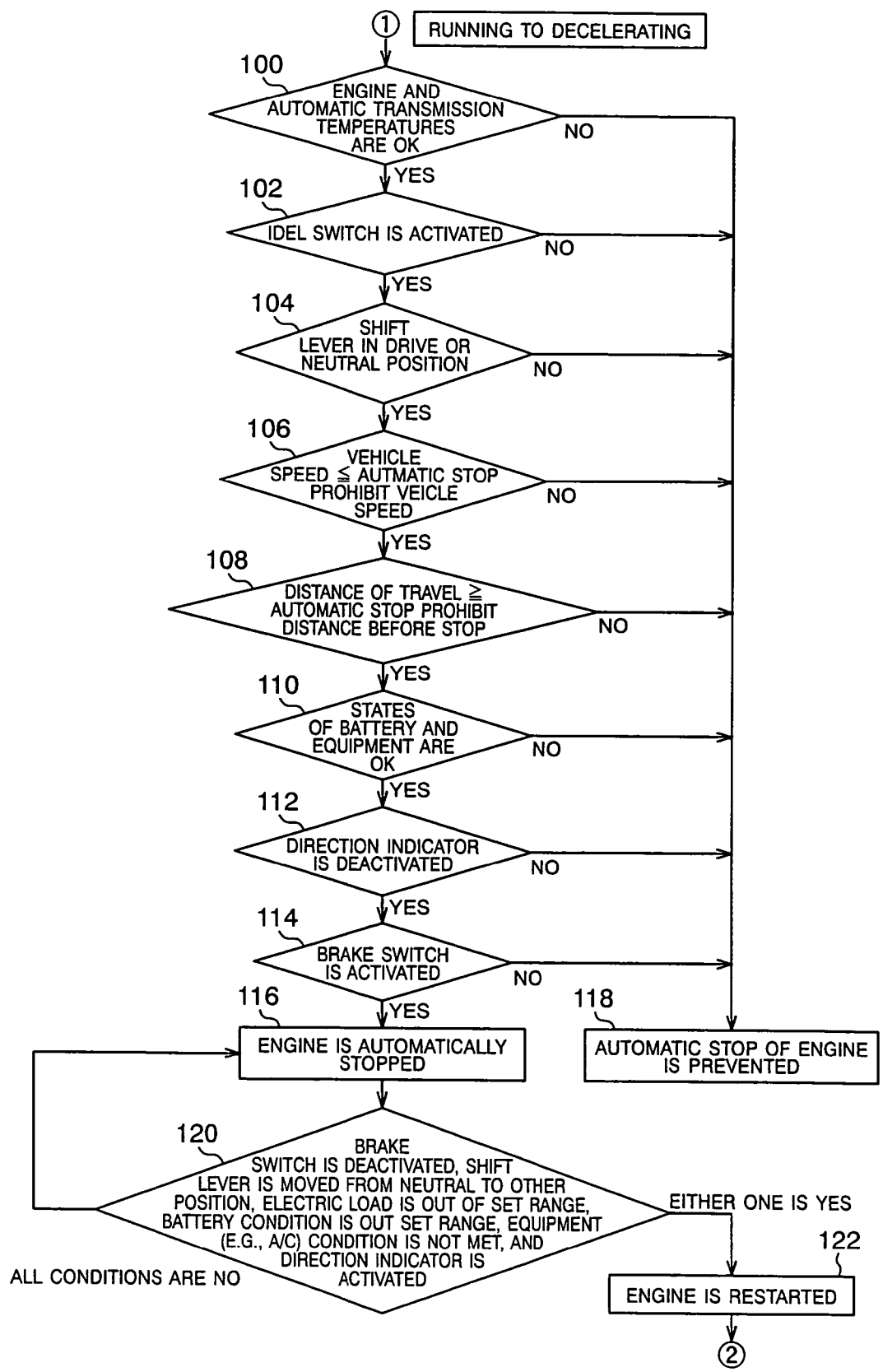
FIG. 1 is a flowchart showing control by an automatic stop/start controller for an engine according to the present invention.
Figure 2:
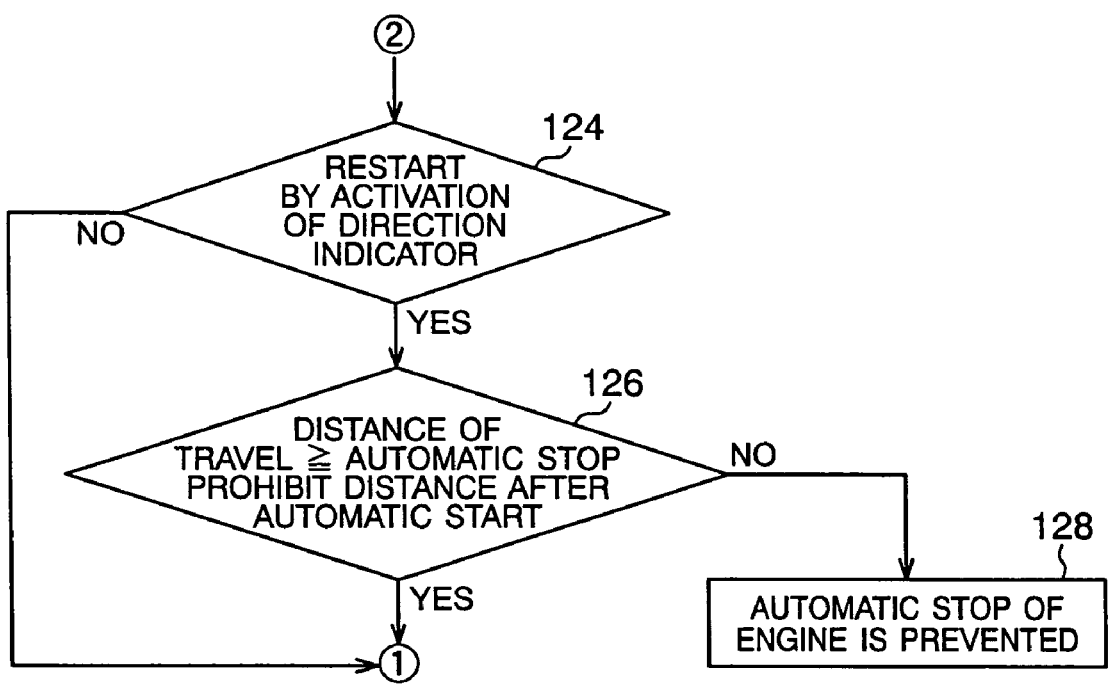
FIG. 2 is a flowchart continued from FIG. 1.
Figure 3:
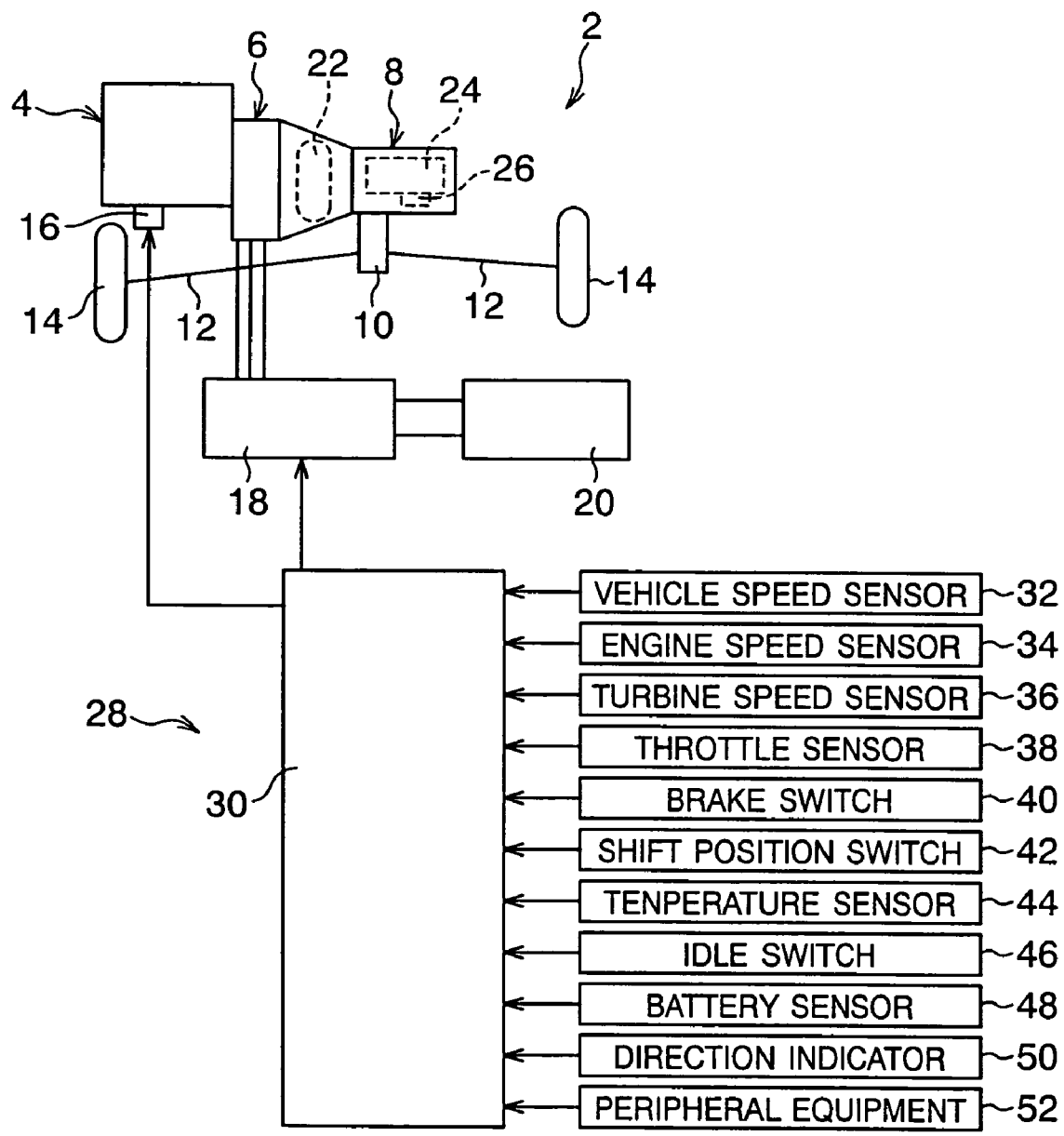
FIG. 3 is a schematic diagram of the automatic stop/start controller.

FIGS. 1–3 illustrate an embodiment of the present invention.

FIG. 3 shows a vehicle 2, an internal combustion engine 4, an electric motor generator 6, and an automatic transmission 8. The vehicle 2 (i.e., a hybrid vehicle) is equipped with the engine 4, and the motor generator 6 to drive the engine 4, and the automatic transmission 8. In the vehicle 2, the driving force is generated by the engine 4 and/or the motor generator 6, and is transmitted from the automatic transmission 8 through a differential 10 and driving shafts 12 to driving wheels 14 to drive the vehicle 2.

The engine 4 is equipped with a fuel injection valve 16. The motor generator 6 is connected to the engine 4 and to a battery 20 through an inverter 18, and performs the function of assisting the engine 2 in generating power at least while the vehicle 2 is running. The motor generator 6 is driven by the electric power of the battery 20 to generate the torque to drive the engine 4, and is also driven by the driving force from the driving wheels 14 to generate electric power to charge the battery 20 through the inverter 18.

The automatic transmission 8 includes a torque converter 22 and a gearing section 24. The torque converter 22 is provided with a pump impeller, a turbine rotor wheel, and a stator (not shown). The torque is increased and transmitted from the pump impeller on an input side to the turbine rotor wheel on an output side. The gearing section 24 includes planet gears (not shown), and a frictional engaging element 26 of hydraulic pressure type formed by a clutch and a brake to switch paths for driving force transmission. The frictional engaging element 26 is engaged and disengaged by oil pressure generated by a mechanical oil pressure pump (not shown) driven by the driving force of the engine 4. Incidentally, this automatic transmission 8 is not equipped with an electrically powered oil pump for oil pressure generation.

The fuel injection valve 16 and the inverter 18 are connected to a control unit or means 30 forming an automatic stop/start controller 28. The control means 30 includes a vehicle speed sensor 32 to detect the vehicle speed, an engine speed sensor 34 to detect the engine speed, a turbine rotational speed sensor 36 to detect the rotational speed of turbine rotor wheel in the torque converter 22, a throttle sensor 38 to detect opening degree of a throttle valve (not shown) of the engine 4, a brake switch 40 to detect a state in which a brake pedal (not shown) of the vehicle 2 is depressed, a shift position switch 42 to detect a location of a shift lever (not shown) for the automatic transmission 8, a temperature sensor 44 to detect the temperature of both the engine 4 and the automatic transmission 8, an idle switch 46 to detect whether the throttle valve (not shown) of the engine is at an idle opening degree, a battery sensor 48 to detect the condition (e.g. voltage) of the battery 20, a direction indicator 50 for the vehicle 2, and a peripheral equipment 52, e.g., an air conditioner (A/C), for the vehicle 2.

The control means 30 of the automatic stop/start controller 28 receives various signals output from the sensors 32, 34, 36, 38 and switches 40, 42, 44, 46, 48 and equipment 52. When an automatic stop condition is satisfied, the fuel injection valve 16 is prevented from supplying fuel, thereby stopping the engine 4. Such an automatic stop condition includes, e.g., when the vehicle 2 is stopped while the engine 4 is operating. When an automatic start condition is satisfied, then the fuel supply by the fuel injection valve 16 begins so as to start the engine 4. Such an automatic start condition includes, e.g., when a drive operation occurs while the engine 4 is stopped. Thereby, the engine 4 can be stopped and started without operation of an ignition key (not shown).

Incidentally, the automatic stop condition is set as a condition in which, e.g., the shift lever is in a "Drive" or "Neutral" range position, the brake pedal is depressed, the vehicle 2 is stopped, and the throttle valve is at an idle opening degree. Also, the automatic start condition is set as a condition in which, e.g., the engine 4 has been automatically stopped, the throttle valve is opened over (i.e. greater than) the idle opening degree, and the brake pedal is released.

In automatically stopping the engine 4 without operation of the ignition key, the control means 30 of the automatic stop/start controller prevents the automatic stopping of the engine 4 at least when the direction indicator 50 of the vehicle 2 is activated. If the direction indicator 50 is activated after the engine 4 is automatically stopped, the control means 30 immediately automatically re-starts the engine 4 without operation of the ignition key. Further, the control means 30 prevents the automatic stopping of the engine 4 until the vehicle travels at least a predetermined "automatic stop prohibit distance" after the engine 4 is automatically re-started.

The automatic stop prohibit distance is a condition to prevent automatic stopping of the engine after the engine has been automatically started. The control means 30 sets the automatic stop prohibit distance at a value greater than an "automatic stop prohibit distance before stop" that is a condition for the distance of travel if the automatic stop occurs.

The operation of this embodiment of the present invention is described as follows.

The control means 30 of the automatic stop/start controller 28 receives the signals from the sensors 32, 34, 36, 38 and switches 40, 42, 44, 46, 48, 50 and equipment 52. The engine 4 is stopped when an automatic stop condition is satisfied while the engine 4 is operating, and the engine 4 is re-started when an automatic start condition is satisfied while the engine 4 is stopped (having been automatically stopped). Thereby, without operation of the ignition key (not shown), the engine 4 can be automatically stopped and then automatically started.

Referring to FIG. 1, the control process of the control means 30 of the automatic stop/start controller 28 starts when the vehicle 2 is to stop after deceleration. Then it is determined whether the automatic stop condition is satisfied from the sensors 32, 34, 36, 38 and switches 40, 42, 44, 46, 48, 50 and equipment 52.

As an automatic stop condition: It is determined at step 100 whether the temperatures of the engine 4 and the automatic transmission 8 detected by the temperature sensor 44 are "OK"; whether the idle switch 46 is activated at step 102; whether the shift lever is in the drive or neutral range position, which is detected by the shift position switch 42 at step 104; whether the vehicle speed detected by the speed sensor 32 is less than or equal to an "automatic stop prohibit vehicle speed" at step 106; whether the distance of travel of the vehicle 2 is more than the "automatic stop prohibit distance before stop" at step 108; whether the state of the battery 48 and the operation of the equipment detected by the respective battery sensor 48 and the equipment 52 are "OK" at step 110; whether the direction indicator 50 is deactivated at step 112; and whether the brake switch is activated at step 114.

If all the determinations at steps 100, 102, 104, 106, 108, 110, 112, 114 are "YES", then the automatic stop condition is satisfied and the engine 4 is automatically stopped at step 116. If any one of the determinations at steps 100, 102, 104, 106, 108, 110, 112, 114 is "NO", then an automatic stop prohibit condition is satisfied and the prevention of the engine 4 from automatically stopping is processed at step 118.

After processing of the automatic stopping of the engine at step 116, another automatic start condition is determined.

After implementing an automatic stop condition at step 116, it is determined at step 120 whether the brake switch 40 is deactivated; whether the shift lever is moved into another position from the neutral range; whether an electric load is out of a set range; whether a condition for a battery control is out of a set range; whether the condition of the environment of the equipment 52 is not satisfied; and whether the direction indicator 50 is activated.

If all the determinations at step 120 are "NO", then the automatic stop of the engine 4 at step 116 is continued. If one of the determinations at step 120 is "YES", then the automatic start of the engine 4 is processed at step 122, and, as shown in FIG. 2, it is determined at step 124 whether this automatic start has occurred due to activation of the direction indicator 50.

If the determination at step 124 is "NO", then the control process goes back to previous step 100 to determine whether the temperature conditions of the engine 4 and the automatic transmission 8 are "OK". If the determination at step 124 is "YES", then a determination is made at step 126 whether the traveling distance of the vehicle 2 is greater than or equal to the automatic stop prohibit distance after automatic start.

If the determination at step 126 is "NO", then the automatic stop prohibit condition is satisfied and automatic stop of the engine 4 is prevented at step 128. If the determination at step 126 is "YES", then the control process goes back to previous step 100 to determine whether the temperature conditions of the engine 4 and the automatic transmission 8 are "OK".

As thus described, according to the automatic stop/start controller 28 for the engine 4, in automatically stopping the engine without operation of the ignition key, the control means 30 prevents an automatic stop of the engine 4 if the direction indicator 50 of the vehicle 2 is activated. If the direction indicator 50 is activated after the engine is automatically stopped, the control means immediately automatically starts the engine without operation of the ignition key. The control means also then prevents the automatic stop of the engine until the distance that the vehicle has traveled, after the engine has been automatically started, is greater than the predetermined automatic stop prohibit distance.

Accordingly, upon the vehicle turning right or left, if the activated direction indicator 50 is deactivated due to the operation of the steering wheel (not shown) and the vehicle 2 is forced to stop at the intersection of the road owing to a traffic jam and the like, the engine 4 is immediately automatically started by activation of the direction indicator 50. If the vehicle 2 is stopped after an automatic start of the engine 4, the engine 4 is not automatically stopped again unless the distance that the vehicle travels is greater than the predetermined automatic stop prohibit distance.

Consequently, the engine 4 is not automatically stopped before the vehicle finishes turning left or right at the intersection of the road. If the engine 4 is automatically stopped, it is immediately automatically started to continue driving by activation of the direction indicator 50. Consequently, a smooth driving experience is realized while respecting the driver's will in making right or left turns of the vehicle.

Since the automatic stop/start controller 28 is not equipped with an electrically powered pump to generate the oil pressure for the automatic transmission 8, there is a time lag between operation of the accelerator pedal and the driving of the engine 4, or the start after an automatic stop of the engine 4. However, the engine 4 is prevented from automatically stopping if the indicator 50 is activated, so that there is no time lag upon turning the vehicle right or left. Accordingly, this permits smooth driving while respecting the driver's will.

Further, in the automatic stop/start controller for the engine 4, the motor generator 6 functions to assist the engine 4 in generating power at least while the vehicle 2 is running. The automatic stop/start controller can be applied to a hybrid vehicle having a motor generator 6 to drive or assist the engine 4.

In the above-mentioned embodiment, the automatic stop of the engine 4 is prevented if the direction indicator 50 of the vehicle 2 is activated. However, the automatic stop of the engine 4 can be prevented with more reliability upon turning the vehicle 2 right or left if the automatic stop is prevented according to not only the activation of the direction indicator 50 but also the operation of a steering wheel (not shown) for turning a vehicle 2 right or left. Even greater reliability in the automatic stop of an engine 4 while turning a vehicle left or right can be achieved by preventing the automatic stop of an engine 4 if the direction indicator 50 is activated and the brake pedal is frequently depressed and released.

Thus, according to the automatic stop/start controller of the present invention, upon the vehicle turning right or left, if the activated direction indicator 50 is deactivated due to the operation of the steering wheel and the vehicle is forced to stop at the intersection of the road owing to a traffic jam and the like, the engine is immediately automatically started by activation of the direction indicator 50. If the vehicle 2 stops again after an automatic start of the engine 4, the engine 4 is not again automatically stopped unless the distance that the vehicle 2 travels is greater than the predetermined automatic stop prohibit distance. Consequently, the engine is not automatically stopped before the vehicle finishes turning left or right at the intersection of the road. If the engine 4 is automatically stopped, the engine 4 is immediately automatically started to continue driving by activation of the direction indicator 50. Thus, a smooth driving experience is realized while respecting the driver's will in making right or left turns of a vehicle.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. An automatic stop/start controller for a vehicle which automatically stops and starts a vehicle engine without operation of an ignition key, wherein: a control unit automatically stops the engine without operation of the ignition key when a condition of vehicle speed is less than or equal to a predetermined vehicle speed, when a condition of distance of travel of the vehicle is more than or equal to a predetermined automatic stop prohibit distance before stop, and when a condition in which a direction indicator of the vehicle is deactivated, are at least satisfied; the control unit automatically starts the engine immediately without operation of the ignition key if the direction indicator is activated after the engine is automatically stopped without operation of the ignition key; and the control unit prevents another automatic stop of the engine until a distance traveled by the vehicle after the engine is automatically started due to activation of the direction indicator is greater than or equal to a predetermined automatic stop prohibit distance after automatic start that is preset with a distance longer than the automatic stop prohibit distance before stop.

2. The automatic stop/start controller as defined in claim 1, wherein a motor generator assists the engine in generating power at least while the vehicle is running.

3. An automatic stop/start controller for a vehicle which automatically stops and starts a vehicle engine without operation of an ignition key, wherein: a control unit automatically stops the engine in a normal automatic stop condition without operation of the ignition key when vehicle speed is less than or equal to a predetermined vehicle speed, when distance of travel of the vehicle is more than or equal to a predetermined automatic stop prohibit distance before stop, and when a direction indicator of the vehicle is deactivated, are all at least satisfied; the control unit automatically starts the engine immediately without operation of the ignition key if the direction indicator is activated after the engine is automatically stopped without operation of the ignition key; and after the automatic start of the engine due to activation of the direction indicator, the control unit provides a different stop condition for stopping the engine than the normal automatic stop condition.

4. The automatic stop/start controller as defined in claim 3, wherein a motor generator assists the engine in generating power at least while the vehicle is running.

5. A method for controlling an automatic stop and an automatic start of an internal combustion engine of a vehicle having an electric motor-generator drivingly coupled to the engine, a control unit that selectively and automatically stops and starts the engine without use of an ignition key, and a direction indicator for selectively indicating a turning direction of the vehicle, comprising the steps of:

automatically stopping the engine without operation of the ignition key when at least:

a sensed vehicle speed is less than or equal to a predetermined vehicle speed;

a sensed distance of travel of the vehicle is more than or equal to a predetermined automatic prohibit distance before stop; and a direction indicator of the vehicle is deactivated;

automatically starting the engine without operation of the ignition key when the direction indicator is activated after the engine is automatically stopped without operation of the ignition key; and after the engine is automatically started by activation of the direction indicator, preventing automatic stopping of the engine until the vehicle travels a predetermined prohibit distance that is greater than the predetermined automatic prohibit distance before stop.

* * * * *